(12) United States Patent
Tzannes et al.

(10) Patent No.: US 7,522,514 B2
(45) Date of Patent: Apr. 21, 2009

(54) SYSTEMS AND METHODS FOR HIGH RATE OFDM COMMUNICATIONS

(75) Inventors: Marcos C Tzannes, Orinda, CA (US); Dongjun Lee, Pleasant Hill, CA (US); Todor Cooklev, Moraga, CA (US); Coliln Lanzl, Nashua, NH (US)

(73) Assignee: Aware, Inc., Bedford, MA (US)

( * ) Notice: Subject to any disclaimer, the term of this patent is extended or adjusted under 35 U.S.C. 154(b) by 691 days.

(21) Appl. No.: 10/382,921

(22) Filed: Mar. 7, 2003

(65) Prior Publication Data

US 2004/0047296 A1 Mar. 11, 2004

Related U.S. Application Data

(60) Provisional application No. 60/363,218, filed on Mar. 8, 2002.

(51) Int. Cl.
H04L 5/16 (2006.01)

(52) U.S. Cl. .............. 370/210; 375/222; 375/219; 375/260; 375/231; 375/232; 375/354; 375/480; 370/207; 370/509

(58) Field of Classification Search ............. 370/235, 370/338, 252, 229; 455/522; 375/229, 232, 375/316
See application file for complete search history.

(56) References Cited

U.S. PATENT DOCUMENTS

| 6,075,769 | A * | 6/2000 | Ghanwani et al. | 370/229 |
|---|---|---|---|---|
| 6,084,917 | A | 7/2000 | Kao et al. | |
| 6,181,714 | B1 | 1/2001 | Isaksson et al. | |
| 6,449,246 | B1 * | 9/2002 | Barton et al. | 370/210 |
| 6,535,550 | B1 * | 3/2003 | Cole | 375/222 |
| 6,549,592 | B1 * | 4/2003 | Jones | 375/354 |
| 7,092,436 | B2 * | 8/2006 | Ma et al. | 375/229 |
| 7,106,715 | B1 * | 9/2006 | Kelton et al. | 370/338 |
| 2004/0151109 | A1 * | 8/2004 | Batra et al. | 370/208 |
| 2008/0049601 | A1 | 2/2008 | Tzannes et al. | |

FOREIGN PATENT DOCUMENTS

| WO | 97/15131 | 4/1997 |
|---|---|---|
| WO | 98/19414 | 5/1998 |

(Continued)

OTHER PUBLICATIONS

International Search Report from PCT/US03/07007 Application dated Aug. 1, 2003.

(Continued)

*Primary Examiner*—Charles N Appiah
*Assistant Examiner*—Randy Peaches
(74) *Attorney, Agent, or Firm*—Sheridan Ross P.C.; Jason H. Vick

(57) ABSTRACT

Messages transmitted between a receiver and a transmitter are used to maximize a communication data rate. In particular, a multicarrier modulation system uses messages that are sent from the receiver to the transmitter to exchange one or more sets of optimized communication parameters. The transmitter then stores these communication parameters and when transmitting to that particular receiver, the transmitter utilizes the stored parameters in an effort to maximize the data rate to that receiver. Likewise, when the receiver receives packets from that particular transmitter, the receiver can utilize the stored communication parameters for reception.

8 Claims, 4 Drawing Sheets

FOREIGN PATENT DOCUMENTS

| WO | 98/59476 | 12/1998 |
|---|---|---|
| WO | WO 00/54473 | 9/2000 |
| WO | 01/82543 | 11/2001 |

OTHER PUBLICATIONS

Supplementary European Search Report for European Patent Application No. EP 03713972, mailed Jul. 27, 2007 (5550-27-PEP).

Written Opinion for International (PCT) Patent Application No. PCT/US03/07007, mailed Feb. 4, 2004.

International Preliminary Examination Report for International (PCT) Patent Application No. PCT/US03/07007, mailed Aug. 24, 2004.

Official Action for Chinese Patent Application No. 03805540.6, mailed Jul. 18, 2008.

Official Action for Indian Patent Application No. 1119/KOLNP/2004-G, mailed Jun. 19, 2008.

Official Action for Canadian Patent Application No. 2,475,442, mailed Sep. 11, 2008.

* cited by examiner

SYSTEMS AND METHODS FOR HIGH RATE OFDM COMMUNICATIONS

RELATED APPLICATION DATA

This application claims the benefit of and priority under 35 U.S.C. §119(e) to U.S. patent application Ser. No. 60/363,218, filed Mar. 8, 2002, entitled "High Rate OFDM Communication System and Method for Wireless LAN," which is incorporated herein by reference in its entirety.

BACKGROUND OF THE INVENTION

1. Field of the Invention

The systems and methods of this invention generally relate to communication systems. In particular, the systems and methods of this invention relate to Orthogonal Frequency Division Multiplexing (OFDM) communication systems, methods and protocols.

2. Description of Related Art

The IEEE 802.11a and 802.11g standards for wireless LANs, which are incorporated herein by reference in their entirety, herein after referred to as 803.11a/g, specify wireless local area network communication systems in the 5 GHz and 2.4 GHz bands. These standards specify the use of OFDM as the modulation method used for communication. OFDM is a multicarrier modulation scheme that performs well in wireless communication channels. The 802.11a/g standards provide data rates of 6, 9, 12, 18, 24, 36, 48 and 54 Mbps. Different data rates are achieved by transmitting different, but constant, numbers of bits on all carriers in the multicarrier system and by operating at different coding rates. Table 1 below illustrates the coding rate and bits per subcarrier for each data rate for an exemplary 802.11a/g transceiver.

TABLE 1

| DATARATE (Mbps) | Coding Rate (R) | Bits per Subcarrier (N_BPSC) |
|---|---|---|
| 6 | ½ | 1 |
| 9 | ¾ | 1 |
| 12 | ½ | 2 |
| 18 | ¾ | 2 |
| 24 | ½ | 4 |
| 36 | ¾ | 4 |
| 48 | ⅔ | 6 |
| 54 | ¾ | 6 |

In order to determine the appropriate transmission data rate, the 802.11a/g transmitter uses a trial and error method of transmitting at various data rates, starting with, for example, the highest or last successful transmission rate, and waits for a positive acknowledgement indication from the receiver that the packet was successfully received. This simple positive acknowledgment indication method is used to optimize communications in conventional 802.11a based wireless systems.

SUMMARY OF THE INVENTION

The exemplary systems and methods of this invention use messages transmitted between a receiver and a transmitter to maximize the communication data rate. In particular, and in accordance with an exemplary embodiment of this invention, a multicarrier modulation system uses messages that are sent from the receiver to the transmitter to exchange optimized communication parameters. The transmitter then stores these communication parameters and when transmitting to that particular receiver, the transmitter utilizes the stored parameters in an effort to maximize the data rate to that receiver. Likewise, when the receiver receives packets from that particular transmitter, the receiver can utilize the stored communication parameters for reception.

Accordingly, aspects of the invention relate to multicarrier modulation communication systems.

Additional aspects of the invention relate to wired or wireless multicarrier modulation communication systems that transmit messages between transceivers.

Additional aspects of the invention relate to transmitting messages between a plurality of transceivers in an effort to optimize a data communication rate.

Further aspects of the invention relate to exchanging optimized communication parameters between a plurality of receivers in a multicarrier modulation system.

Additional aspects of the invention relate to exchanging communication parameters between a plurality of transceivers in a wired or wireless multicarrier modulation communications network to regulate the data rate between the transceivers.

These and other features and advantages of this invention are described in, or apparent from, the following detailed description of the embodiments.

BRIEF DESCRIPTION OF THE DRAWINGS

The embodiments of the invention will be described in detailed, with reference to the following figures, wherein.

DETAILED DESCRIPTION OF THE INVENTION

The exemplary systems and the methods of this invention will be described in relation to a multicarrier modulation communication system. However, to avoid unnecessarily obscuring the present invention, the following description omits well-known structures and devices that may be shown in block diagram form or otherwise summarized. For the purposes of explanation, numerous specific details are set forth in order to provide a thorough understanding of the present invention. It should be appreciated however that the present invention may be practiced in a variety of ways beyond the specific details set forth herein. For example, the systems and methods of this invention can generally be applied to any type of communications system including wired communication systems, wireless communication systems, such as wireless LANs, power line communication systems, wired or wireless telephone line communication systems, or any combination thereof.

Furthermore, while the exemplary embodiments illustrated herein show the various components of the communication system collocated, it is to be appreciated that the various components of the system can be located at distant portions of a distributed network, such as a telecommunications network and/or the Internet, or within a dedicated multicarrier modulation system. Thus, it should be appreciated that the components of the communication system can be combined into one or more devices or collocated on a particular node of a distributed network, such as a telecommunications network. It will be appreciated from the following description, and for reasons of computational efficiency, that the components of the communications system can be arranged at any location within a distributed network without affecting the operation of the system.

Furthermore, it should be appreciated that the various links connecting the elements can be wired or wireless links, or any combination thereof, or any other known or later developed element(s) that is capable of supplying and/or communicating information to and from the connected elements. Additionally, the term module as used herein can refer to any known or later developed hardware, software, or combination of hardware and software that is capable of performing the functionality associated with that element.

Additionally, while this invention will be described in the relation to multicarrier modulation systems, the systems and methods of this invention can be applied to any communication system or transport protocol for transmitting information.

Figure 1:
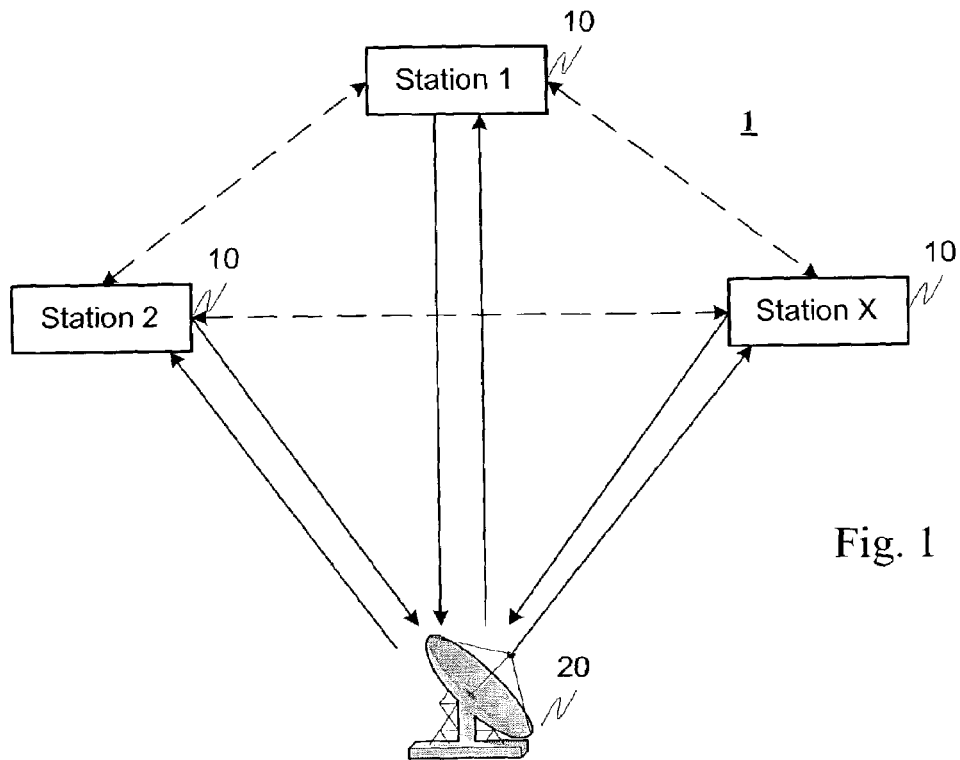
FIG. 1 is a functional block diagram illustrating an exemplary communication system according to this invention.

FIG. 1 illustrates an exemplary communication system 1. Communication system 1 comprises one or more stations 10 and an access point (AP) 20. This exemplary embodiment illustrates a wireless LAN where a plurality of stations 10 communication with the access point 20. In particular, in its exemplary wireless LAN, multiple stations 10 share a common communication medium. One possible configuration includes an access point 20 that is used to communicate between the stations 10 (BSS). The access point 20 provides the local relay functionality between the stations 10 and to, for example, other wired and/or wireless networks (not shown). Therefore, when station 1 communicates with station 2, the communication, e.g., a packet, is sent from station 1 to the access point 20, and then from the access point 20 to station 2. For this reason, in most cases a station 10 is only transmitting packets to the access point 20 and receiving packets from the access point 20. The access point 20 on the other hand, must communicate with all the stations 10 in the network.

Another possible configuration does not rely on an access point 20, but instead communications take place directly between the stations 10 (IBSS) in the network illustrated by the dashed lines in FIG. 1. In this embodiment, where communications occur directly between the stations 10, there are no relay functions served by the access point 20.

In accordance with an exemplary embodiment of this invention, the wireless network relies on communicating parameters between a plurality of transceivers and in particular from a receiver to a transmitter. These parameters are stored at the transmitter and are used for subsequent transmission of packets to the receiver the parameters were received from. Thus, the systems and methods of this invention will work equally well whether the network is configured to have an access point 20, or not, as each station, including the access point, if used, maintains tables comprising the communication parameters.

Several different types of communication parameters can be sent from the receiver to the transmitter to optimize communication to, for example, increase or decrease the data rate. In general, any parameter that can modify performance can be included in the message. The following examples are the more common types of communication parameters that can be exchanged between the receiver and the transmitter.

The Bit Allocation Table (BAT)—the bit allocation table in multicarrier modulation systems specify the number of bits modulated on each carrier, which are also referred to as subchannels, subcarriers, tones or bins, in a multicarrier modulation system. The 802.11a/g transceivers use the same number of bits on all subchannels, which is the simplest type of bit allocation table. Since wireless communications experience multipath, the communications channel is not flat in frequency, which means that different subcarriers will have different signal to noise ratios (SNRs). Therefore, in order to achieve a constant bit error rate (BER) on all carriers, a bit allocation table is used so that carriers with a higher SNR modulate more bits than carriers with a lower SNR. This process is often referred to as "bit loading." Bit loading and the use of a bit allocation table has been used in ADSL multicarrier communication systems for years. For example, ITU standards G.992.1 and G.992.2, which are incorporated herein by reference in their entirety, are international ADSL standards that specify communication using bit loading and bit allocation tables. Bit loading also enables using constellation sizes much higher than 64 QAM (6 bit) which is the maximum constellation size of standard 802.11a/g systems. Bit loading constellations that modulate up to 15 bits, or more, can be used, if supported by the channel, thereby achieving significant data rate improvements.

Coded modulation parameters—systems that use coded modulation techniques, such as trellis coded modulation and turbo coded modulation, achieve much higher coding advantages than systems that do not combine modulation and forward error correction encoding. However, coded modulation schemes do not encode all information bits and therefore coded modulation must be combined with bit loading in multipath channels in order to achieve the coding gain benefits.

Variable cyclic prefix length—the cyclic prefix (CP) is used in multicarrier systems to combat multipath. In general, as long as the impulse response of the channel is less than the CP length, there will be no inter-symbol interference (ISI) or inter-channel (ICI) interference due to the channel multipath. However, since the CP is a redundant cyclic extension added to every communication symbol, the CP also results in a data rate loss. The 802.11a/g standards use a fixed CP with a length of 0.8 microseconds, which is 20% of the symbol length. Therefore, the addition of the CP results in a 20% data rate reduction. This is a good tradeoff if the channel is approximately the same length as a CP. However, if the channel is much shorter, e.g., only 0.1 microseconds, then it makes sense to decrease the CP length to 0.1 microseconds in order to get a 19% data rate improvement. Likewise, if the channel is much longer than 0.8 microseconds, the CP should be extended to match the length of the channel because significant levels of ISI and ICI will probably greatly reduce the achievable data rate.

Variable pilot tone allocation—standard 802.11a/g receivers use four fixed pilot tones that are spread across the transmission frequency band. This is necessary in 802.11a/g systems since the transmitter does not know which portions of the frequency bands are in deep nulls due to multipath. In accordance with an exemplary embodiment of this invention, the receiver can communicate to the transmitter which carrier should be used for pilot tones. Since the receiver can determine which carriers have a high SNR, the receiver can instruct the transmitter to place pilot tones on those high SNR carriers. In fact, in many cases, a single high SNR carrier is sufficient to be used for all timing recovery requirements thereby allowing the system to transmit data on the three carriers that the 802.11a/g systems use for pilot tones. This also provides a data rate increase when compared to standard 802.11a/g systems.

Alternatively, the communication system may not have any carriers dedicated as pilot tones, i.e., all carriers that are modulated are modulated with information bits. In this case, a carrier that carries information bits may be used to perform "decision-directed" timing recovery algorithms. For example, a carrier that is used for this type of decision-directed algorithm will often carry fewer bits than actually possible at the specified BER in order to provide a reference signal with a high SNR.

Fine gains per carrier—Fine gains are used in ADSL standards such as G.992.1 to equalize the BER across all the carriers when bit loading is used. Fine gains are small adjustments in the transmit power level that enable a subchannel to achieve the BER required by the system based on the specific measure of SNR.

Throughout the following discussion, exemplary embodiments of this invention will be directed toward the bit allocation tables (BATs) as the primary optimized communication parameter that is being exchanged between the stations. This is done because the use of BATs is one of the most effective ways to achieve optimized communication and to modify data rates. However, it is to be appreciated that other communication parameters including, but not limited to, fine gains, trellis coded modulation, pilot tone location, variable cyclic prefix length, and the like, can also be exchanged, with or without BATs, between stations to realize a change in data rate.

To implement a change in data rates, a message containing the communication parameters is sent from a receiver to a transmitter. These communication parameters can be communicated in a plurality of ways. For example, the communication parameters can be sent to the transmitter as part of a positive acknowledgment packet. In this case, after receiving the positive acknowledgment packet, the transmitter would use the communication parameters contained in the positive acknowledgment packet for the transmission of subsequent packets. The communication parameters could also be sent, for example, as part of a management or data frame that is intended to communicate information between the transceivers. For example, the communication parameters could be sent as part of an extended header field of any packet sent between the transceivers.

Figure 2:
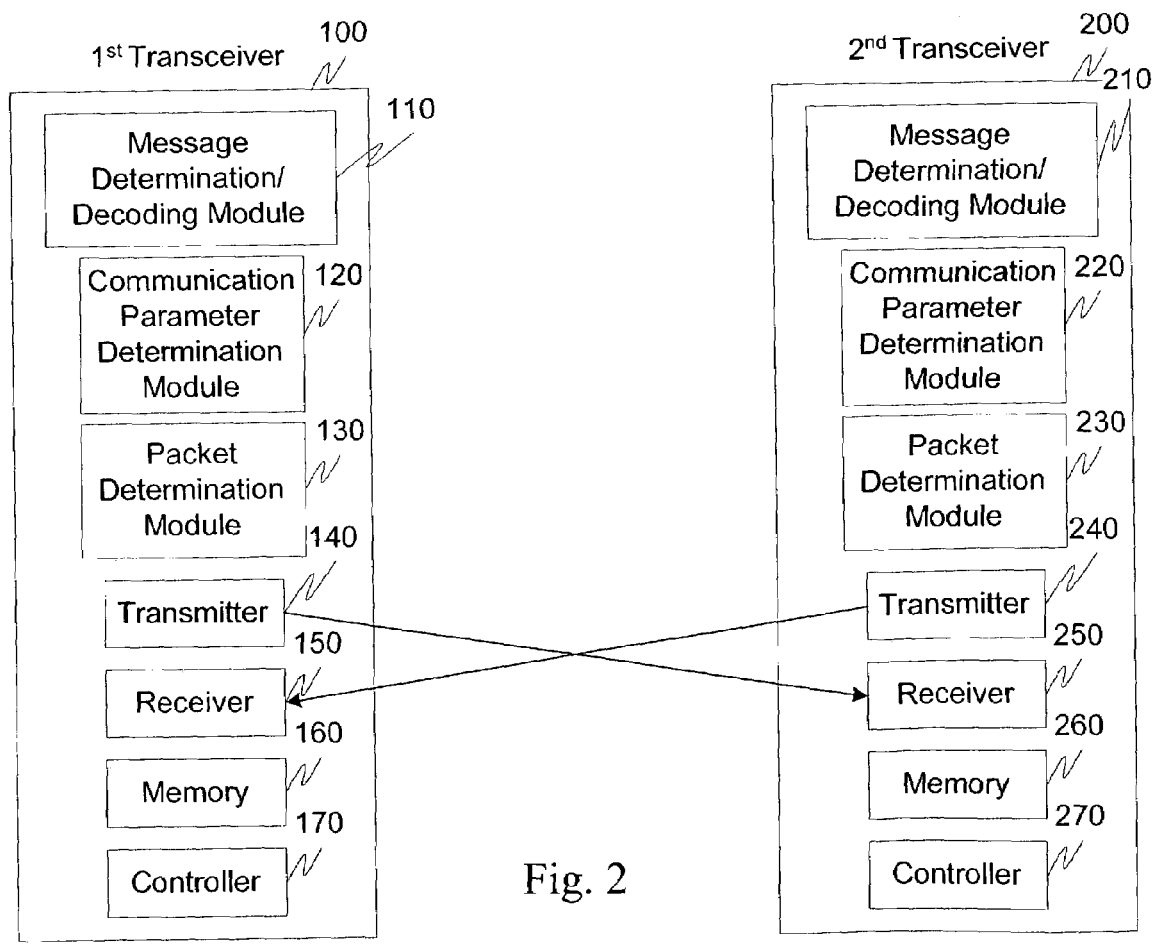
FIG. 2 is a functional block diagram illustrating the components of a first and a second transceiver according to this invention.

The exemplary embodiment of the protocol used for exchanging communication parameters in accordance with an exemplary embodiment of this invention will be discussed in relation to FIGS. 1 and 2. In particular, FIG. 1 illustrates an exemplary network 1, such as a wireless network. The network 1 comprises a plurality of stations 10 interconnected by a plurality of links and an access point 20. FIG. 2 illustrates an exemplary embodiment of the components associated with a first and a second transceiver, e.g., the stations 10 or the access point 20. In particular, the first transceiver 100 comprises a message determination module 110, a communication parameter determination module 120, a packet determination module 130, a transmitter 140, a receiver 150, a memory 160, and a controller 170, all connected by a link (not shown). The second transceiver 200 comprises a message determination module 210, a communication parameter determination module 220, a packet determination module 230, a transmitter 240, a receiver 250, a memory 260, and a controller 270, all connected by a link (not shown).

For ease of illustration the exemplary method used for the high rate OFDM communication systems will be discussed in relation to a first transceiver sending packets to a second transceiver. For example, the first transceiver could be station 2 and the second transceiver the access point 20. Alternatively, the first transceiver could be station 2 and the second transceiver, station 1, or the like. The relevant portion of the protocol commences with the first transceiver sending a packet at one of a highest possible data rate, e.g., 54 Mbps for 802.11a/g, at the data rate of the last successful transmission, or at a known data rate.

Specifically, the packet determination module 130, in cooperation with the transmitter 140, the memory 160 and the controller 170 coordinate the transmission of this first packet, i.e., before any optimized communication parameters are exchanged, and transmit the packet using standard size fixed communication parameter settings such as those specified in IEEE 802.11a/g, e.g., fixed six bits per tone on all carriers.

Next, if the second transceiver's receiver 250 successfully receives the packet from the first transceiver 100, the second transceiver 200 returns to the first transceiver a positive acknowledgment packet again with the cooperation of the packet determination modulation 230, the transmitter 240, the memory 260 and the controller 270. This positive acknowledgment packet also comprises optimized communication parameters determined by the communication parameter determination module 220 to be used by the second transceiver 200 for subsequent reception of packets from the first transceiver 100. For example, the positive acknowledgment packet may contain a BAT with different bits per sub-carrier based on, for example, the channel characteristics as measured by the second transceiver 200 and determined by the communication parameter determination module 220. Alternatively, or in addition, this acknowledgment packet may also indicate any of the optimized transmission parameters described above, e.g., which one or more carriers should be used as pilot tones as discussed above.

If the second transceiver 200 does not successfully receive the packet from the first transceiver 100, the second transceiver 200 does not return to the first transceiver a positive acknowledgment packet. In this case, the first transceiver 100, again in cooperation with the packet determination module 130, the transmitter 140, the memory 160 and the controller 170, sends a packet at the next highest or another known standard data rate.

If the first transceiver 100 receives the positive acknowledgment packet, the first transceiver 100, in cooperation with memory 160 stores the optimized communication parameters. The first transceiver 100 then uses the stored communication parameters for transmission of subsequent packets to the second transceiver 200. The use of the optimized communication parameters is indicated in the header field of the packet sent from the first transceiver 100 to the second transceiver 200. For example, the message determination module 110 modifies the header field to indicate which optimized communication parameters are being used.

The second transceiver's receiver 250 receives the packet from the first transceiver 100 and determines which communication parameters were used based on the information in the data field of the packet. This is accomplished by, for example, decoding the header field of the packet that indicates that optimized communication parameters are being used. The packet can then be demodulated and decoded based on the information contained in the data field in association with the message determination/decoded module 210 using the optimized communication parameters that were sent from the second transceiver to the first transceiver in the previous positive acknowledgement packet.

After the second transceiver 200 receives from the first transceiver 100 the packet which has the header field specifying which optimize communication parameters were used, the second transceiver 200 sends a positive acknowledgment back to the first transceiver 100. This positive acknowledgment may contain the same parameters as used for the last successful received packet as an indication to the second transceiver 200 to continue transmitting with the stored optimized communication parameters. Equivalently, the positive acknowledgment may be just a basic acknowledgment packet, as in conventional 802.11a/g systems, to indicate that the packet was successfully received at the second transceiver and communication should continue using the same optimized communication parameters. In the event that optimized communication parameters accompany every positive acknowledgement during an extended communication session, this mechanism effectively tracks Alternatively, the second transceiver 200 may send a new, second set of optimized communication parameters in the acknowledgment message. These new parameters could, for example, request a change in data rate, such as a higher data rate. In this case, the first transceiver 100 could start using the second set of optimized communication parameters for transmission after receiving the acknowledgment packet.

In the case where the second transceiver 200 does not successfully receive the packet transmitted by the first transceiver 100 that has the modified header field specifying which communication parameters were used, the second transceiver 200 will not send a positive acknowledgment back to the first transceiver 100. In this case, the first transceiver 100 would determine that the optimized communication parameters are no longer valid and will start the protocol all over again by going back to the first step were the first transceiver 100 will commence communication at a known data rate, such as the highest data rate, e.g., 54 Mbps in 802.11a/g systems, using the fixed/standard communication parameters.

In the case were the first transceiver 100 receives the positive acknowledgment from the second transceiver 200 after transmitting a packet using the first set of optimized parameters, and this positive acknowledgment contains a new, second set of optimized parameters, these new parameters should be used for subsequent transmission of packets. However, if the second transceiver 200 does not receive a positive acknowledgment packet after sending a packet using the second set of optimize parameters, then the second transceiver 200 reverts back to the first step of the protocol were a packet is sent at a known e.g., next highest data. However, in this case, the first transceiver may start by transmitting using the first set of optimized communication parameters or by transmitting at a data rate using a fixed/standard communication parameter, e.g., 54 Mbps in the 802.11a/g standard.

Alternatively, or further in addition, the first transceiver 100 and the second transceiver 200 may periodically send "reference" or "training" packets that can be used by the receiver portion of the transceiver in conjunction with the communication parameter determination module to determine the optimized transmission parameters. For example, these training packets can be packets that contain signals that are known to the transceivers in advance. For example, the training packets can be non-information carrying packets that are sent during times when there is no data to be sent between the stations and the network. Since these packets are predefined and known to the receiver prior to reception, the receivers can use them to accurately measure the effects of the channel, such as the multipath profile, the SNR per carrier, or the like. These training packets can also be used to train receiver equalizers that are used to equalize, for example, the wireless channel and/or receiver filters and/or transmitter filters.

In conventional wireless LAN systems, every packet contains a header field that indicates the data rate used for transmitting the data field of the packet. The header field is transmitted using a fixed modulation/encoding scheme, such as in the 802.11a/g standard, and therefore can be demodulated by all stations. In accordance with an exemplary embodiment of this invention, the header field will also indicate whether optimized communication parameters were used for transmitting the data field in the packet. This could be done in several ways. For example, the header field could contain the indication of the data rate as in 802.11a/g. Alternatively, the header field could contain a bit field that indicates whether the optimized communication parameters are to be used. This bit field could be a single bit that indicates either to use the last exchanged optimized communication parameters, or one of the standard fixed communication parameters. Alternatively, the bit field could be a plurality of bits indicating one of a plurality of sets of optimized communication parameters.

In the example of a network with a access point 20, each station transmitter would store optimized communication parameters to be used when sending packets to the access point 20. These optimized parameters would be generated by the access point 20 receiver and sent to the station(s) as described above. Obviously, since each station 10 is in a different location, and could possibly move, each station transmitter would probably have different optimized parameters to be used when sending packets to the access point 20. The access point 20 must also store these optimized parameters to be used by the access point 20 receiver when receiving packets from the various stations 10. For each station 10, the access point 20 may have a different set of optimize parameters. Since the access point 20 receives packets from all stations, the access point 20 must be able to determine the parameters used for the data field based on the information in the packet header, i.e., the SIGNAL field. The access point 20 can use the packet header to determine whether the optimized parameters have been used, but since the access point 20 does not know which station actually sent the packet, the access point 20 may not be able to determine the correct parameters based on the header alone.

Accordingly, and in accordance with the exemplary embodiment of this invention, the header also includes a bit field that indicates which station sent the packet. In this case, the access point 20 would use that information to determine which set of parameters should be used. Alternatively, the access point 20 may use other measures to determine which station sent the packet. For example, the access point 20 could use the power of the received signal, the channel estimate based on frequency equalizer taps, carrier offset values, or the like.

In the example of a network, such as a wireless LAN, with an access point 20, the access point transmitter would store the optimized communication parameters to be used when sending packets to a specific station 10. These optimized communication parameters would be generated by the station receiver and sent to the access point 20 as described above. Obviously, since each station is in a different location, the access point 20 could have a plurality of sets of different optimized communication parameters to be used when sending packets to the different stations 10. Each station 10 would then also store the optimize communication parameters corresponding to that station to be used by the station receiver when receiving packets from the access point 20. Each station 10 should also be able to determine the communication parameters used for the data field based on the information in the packet header, i.e., SIGNAL field. Therefore, each station 10 uses the packet header to determine whether the optimized communication parameters have been used. Unlike the access point receiver, each station receiver is intended to receive packets only from the access point 20 and therefore a station 10 may be able to determine the communication parameters based on the header alone.

Since all stations will receive packets from the access point 20, each station must also be able to determine the communication parameters used for the data field based on the preamble and the packet header, i.e., the SIGNAL field. Obviously, if the packet is not intended for a particular station receiver, the receiver may use the incorrect optimized communication parameters to receive a packet. This is actually not a problem since the packet was not intended for that receiver in the first place. However, since the protocol requires transmitters to defer to communications already in progress, every station must be able to determine various protocol counters based on the packet duration. The header must provide a way to determine the packet duration even if use of the wrong communication parameters does not permit the receiver to correctly decode the message.

As discussed above, once the receiving transceiver determines the optimized transmission parameters, the receiving transceiver needs to send this information to the transmitting transceiver to be used for subsequent communication between the two devices. Furthermore, as discuss above, the optimized transmission information can be sent as part of an acknowledgment packet. Alternatively, or in addition, the optimized transmission parameters can be exchanged as part of a management frame or regular information carrying frame on a periodic or, for example, triggered basis. In either case, the optimized transmission parameters can be sent as part of an extended packet header field, also known as the SIGNAL field, or as part of the packet information field. In the case of an extended packet header field, the information is sent at a fixed rate and can be decoded by all systems in the network. For example, a bit in the packet header field can be used to indicate that a new set of optimized transmission parameters has been appended to an extended packet header field.

In the latter case, the information can be sent using optimized parameters for communication. Note that in this case the optimized transmission parameters that are used for transmitting the optimized transmission parameter information from the receiver to the transmitter are not the same. For example, assume that the receiver of the first transceiver 150 determines optimized transmission information for transmitting packets from the second transceiver's transmitter 240 to the first transceiver's receiver 150. The first transceiver's transmitter 140 sends a packet to the second transceiver's receiver 250 where the packet contains the optimized transmission parameters for transmitting packets from the second transceiver's transmitter 240 to the first transceiver's receiver 150. The packet that is sent from the first transceiver's transmitter 140 to the second transceiver's receiver 250 may be sent using a standard fixed rate, as is done in conventional 802.11a/g systems, or may be sent using optimized transmission parameters communicated between the first transceiver 100 and the second transceiver 200. Obviously, the optimized transmission parameters used for transmission from the first transceiver 100 and the second transceiver 200 would have been exchanged earlier in the communications session.

Figure 3:
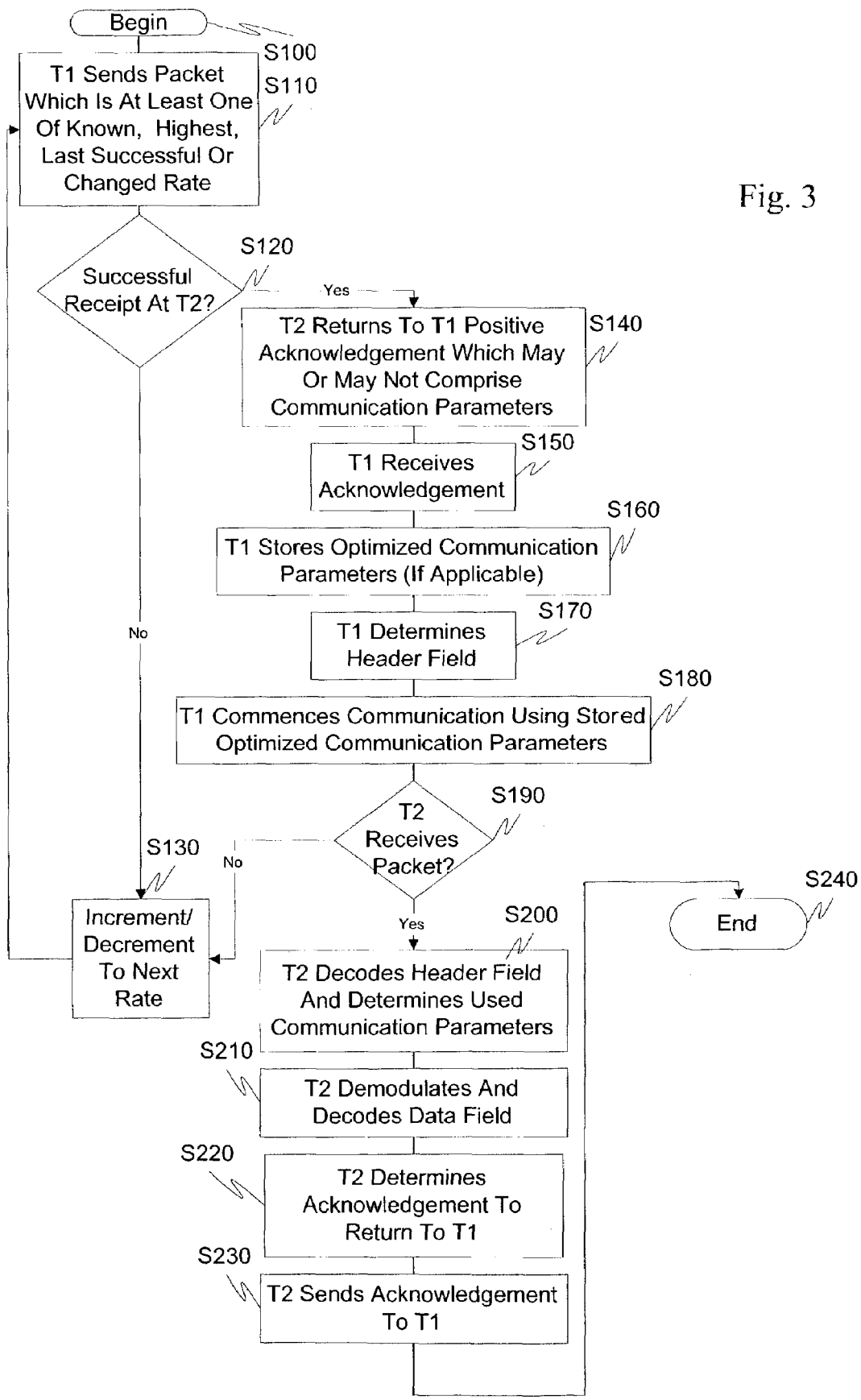
FIG. 3 is a flowchart illustrating an exemplary communication method according to this invention.

FIG. 3 is a flowchart illustrating a general exemplary method of exchanging communication parameters according to this invention. Specifically, control begins in step S100 and continues to step S110. In step S110, a first transceiver (designated T1) determines and sends a packet that is at least one of a known, highest, last successful or changed rate to a second transceiver (designated T2). Next, in step S120, a determination is made whether the packet was successfully received at the second transceiver. If the packet was not successfully received, control jumps to step S130. Otherwise, control continues to step S140.

In step S130, the communication parameters specifying the data rate are incremented/decremented as appropriate. Control then continues back to step S110.

In step S140, the second transceiver returns to the first transceiver a positive acknowledgment that may or may not comprise optimized communication parameters. If the positive acknowledgement contains optimized communication parameters, the second transceiver stores these parameters. Next, in step S150, the first transceiver receives the acknowledgment. Then, in step S160, the first transceiver stores the optimized communication parameters if the positive acknowledgment returned from the second transceiver contains communication parameters. Control then continues to step S170.

In step S170, the first transceiver determines a header field. Next, in step S180, the first transceiver commences communication using the stored optimized communication parameters. Then, in step S190, a determination is made whether the second transceiver received the packet. If the packet was received, control continues to step S200. Otherwise, control jumps to step S130.

In step S200, the second transceiver decodes the header field and determines the communication parameters that were used. Next, in step S210, the second transceiver demodulates and decodes the data field using the stored optimized communication parameters. Then, in step S220, the second transceiver determines the acknowledgment to return to the first transceiver. Control then continues to step S230.

In step S230, the second transceiver sends the acknowledgment to the first transceiver. This message may or may not contain optimized communication parameters. Control then continues to step S240 where the control sequence ends.

The basic concepts discussed above can also be extended to legacy systems. In the following discussion, stations that only implement the current 802.11a/g standard will be referred to as legacy stations. Stations that are enabled with the methods of this invention to provide high data rate communications with optimized communication parameters will be referred to as extended rate (ER) stations. The method and protocols that enable exchanging, transmitting and receiving using these optimized communication parameters are referred to as extended rate systems and protocols. In this exemplary embodiment, an extended rate station also supports the current 802.11a/g standard.

Figure 5:
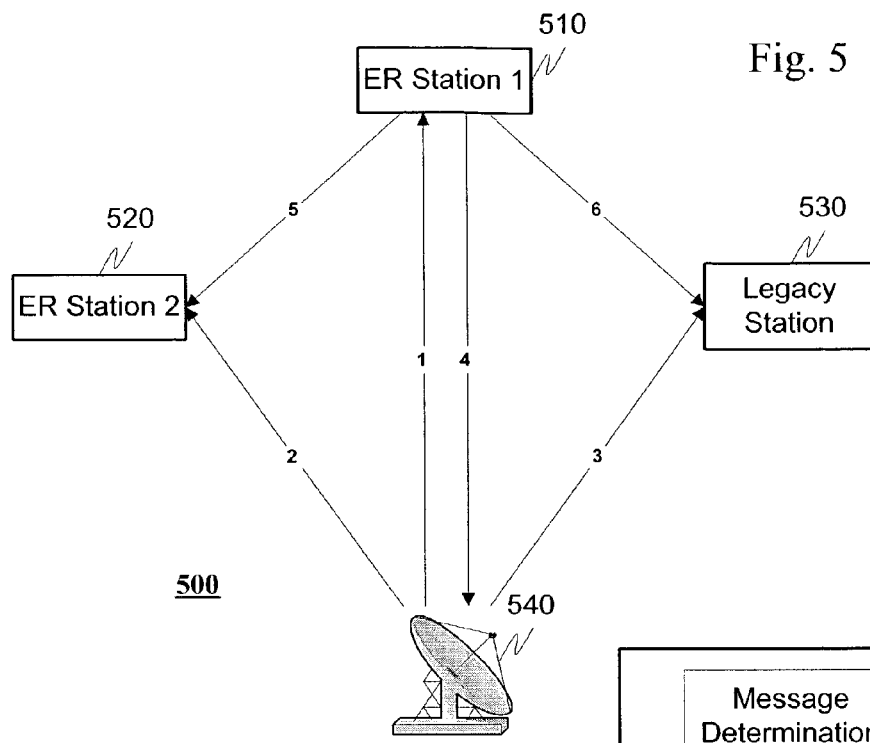
FIG. 5 illustrates a second exemplary communication system according to this invention.

For example, FIG. 5 illustrates an exemplary communication system 500 that comprises a plurality of extended rate stations 510, 520, one or more legacy stations 530 and, for example, an access point 540.

When operating in an environment with legacy stations 530 and extended rate stations 510, 520 there are two main interoperability requirements to ensure network stability. First, a legacy station 530 must be able to receive the ER packet header (SIGNAL field) and use the SIGNAL field parameters to correctly determine the packet duration, i.e., the time required for packet transmission. This will guarantee that the legacy station 530 will correctly set its network allocation vector (NAV) and other related counters so that accurate operation of the contention algorithm for the medium access will be maintained.

Secondly, an extended rate station 510, 520 must be able to determine the transmission parameters e.g., the bit allocation table, based on an extended rate packet header if the packet is intended for that station. In addition, an extended rate station that was not intended to receive the packet must also use the SIGNAL field parameters to correctly determine the packet duration, i.e., the time required for packet transmission. This will ensure that the extended rate station will correctly set its network allocation vector (NAV) and other related counters so that accurate operation of the contention algorithm for the medium access will be maintained.

Figure 4:
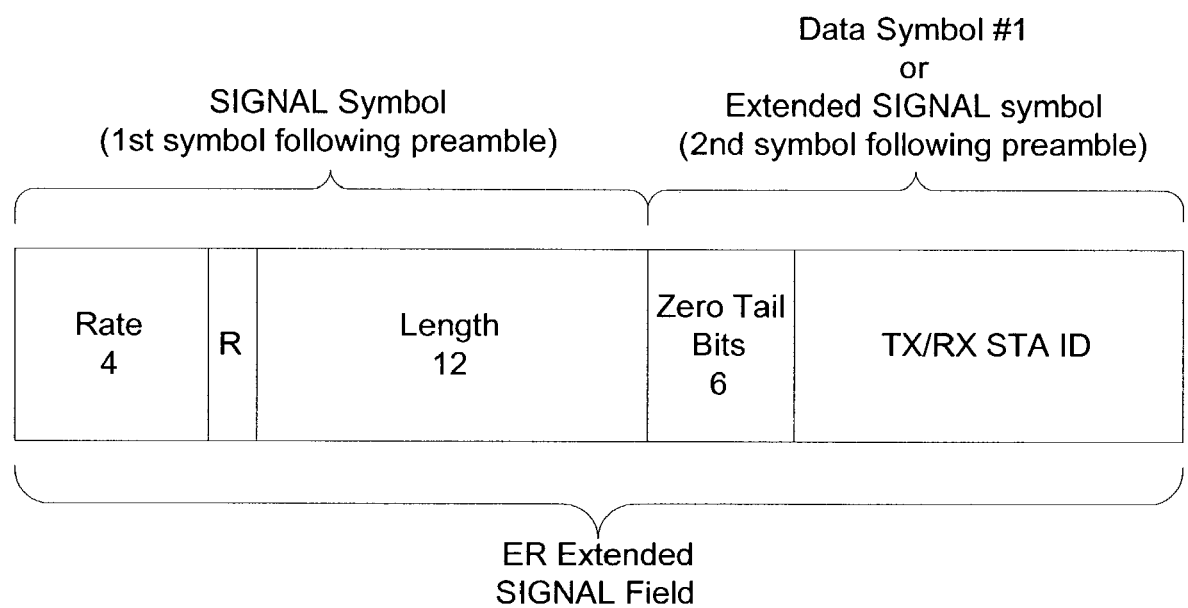
FIG. 4 illustrates an exemplary extended signal field according to this invention.

In an effort to ensure the two above requirements are met, FIG. 4 illustrates an exemplary modified packet header using an extended signal field. In this illustrative 802.11a example, the SIGNAL field is extended. The first part of the extended SIGNAL field has a structure identical to the standard 802.11a SIGNAL field header. The first symbol of the extended SIGNAL field is modulated according to the SIGNAL modulation encoding parameters as specified in IEEE 802.11a for the standard SIGNAL field, i.e., 6 Mbps BPSK, code rate=½. Therefore, a legacy station can correctly receive the signal field bits from the first part of the extended SIGNAL field.

The second part of the extended signal field in the next symbol contains the transmitter (TX) and receiver (RX) station identifiers. These extended signal field bits are also modulated using the 802.11a 6 Mbps, code rate=½ modulation method. In FIG. 4, these extended signal field bits are sent in the second symbol of the extended signal field header that corresponds to the data symbol number one in a standard 802.11a system.

Since there are both legacy and extended rate stations in the exemplary communication system 500 illustrated in FIG. 5, an extended rate station needs to be able to determine and identify when a received packet contains an extended signal field header, which is contained in two symbols, as opposed to a standard 802.11a header, which contained in only one symbol. This can be accomplished by setting a bit in the standard 802.11a SIGNAL field. This bit will be referred to as the ER-enable bit. As an example, the 802.11a reserved bit between the rate field and the length field can be used as the ER-enable bit. For example, when this reserved bit (R) is set to 1, this indicates that an extended rate header is being used. When the reserved bit (R) is set to 0, this indicates that a standard 802.11a header is being used.

Again with reference to FIG. 5, two ER stations 510 and 520 are illustrated along with a legacy station 530 and an extended rate access point 540. The various links in FIG. 5 represent, for example, the communication paths of an extended rate packet where the ER-enable bit (R) is flagged in the reserved bit R position and the TX/RX STA ID (Transmitter/Receiver Station Identifier) is present in the extended SIGNAL field.

Figure 6:
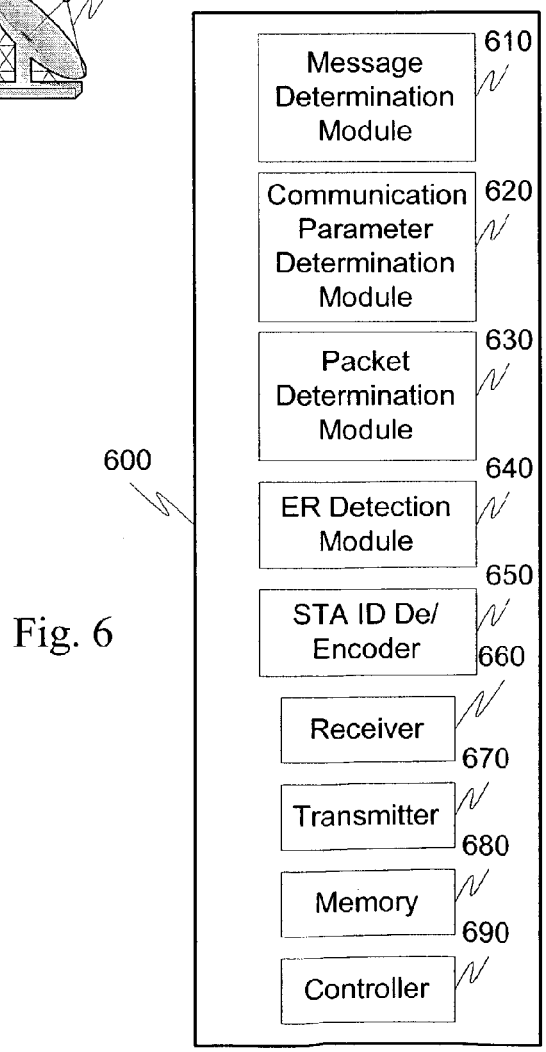
FIG. 6 illustrates an exemplary transceiver in accordance with the second exemplary embodiment of this invention.

The exemplary communications that occur between the various stations will be discussed in relation to FIGS. 5 and 6. In particular, FIG. 6 illustrates the exemplary components that could be present in a station illustrated in FIG. 5. In particular, the station 600 comprises a message determination module 610, a communication parameter determination module 620, a packet determination module 630, an ER detection module 640, a station ID decoder/encoder 650, a receiver 660, a transmitter 670, a memory 680 and a controller 690. Many of the components illustrated in the station 600 are comparable to those seen in the first transceiver 100 and second transceiver 200. Accordingly, the functions of those components will not be re-discussed in association with this embodiment of the invention.

Communication path 1: Transmission of packets from the access point 540 to a ER capable station, such as ER station 510.

The access point 540 forwards to the ER station 510 a packet. The ER station 510 detects the ER-enable bit with the cooperation of the ER detection module 640 and determines that the packet is an ER packet.

Next, the station ID decoder/encoder 650 decodes the RX STA ID bits and the extended header field to determine if the received packet is intended for this particular station. The ER station 510 also decodes the TX STA ID in the extended rate header with the cooperation of the station ID decoder/encoder 650 and determines if this packet is coming from the access point 540. Based on this information, the receiving extended rate station 510 uses the stored optimized communication parameters that are to be used when receiving the packets from the access point 540. The extended rate station 510 uses the optimize parameters to correctly decode the remainder, i.e., the data field, of the packet. Naturally, the RX station had sent these optimized communication parameters to the AP earlier in the session.

Communication Path 2: Another ER-capable station, e.g., station 520, accidentally receives a packet from the access point (AP) 540.

The station 520, in cooperation with the ER detection module 640, detects the ER-enable bit in the packet sent from the access point 540, and determines that the packet is an ER packet and, with the cooperation of the STA ID de/encoder 650, decodes the RX STA ID bits in the extended header field and determines that the received packet is not intended for this particular station. The station 520 then sets the NAV, and related counters, based on the "spoofed" RATE, LENGTH information contained in the SIGNAL Field, as discussed below.

Since the station 520 determines that the received packet is not intended for itself, the station 520 does not even have to decode the packet. An additional benefit of this method is that when a packet is received, a station can detect very early whether it is the intended recepient of the the packet and therefore the station does not need to decode the remainder of the packet if it is not. This will, for example, save power in the station since the station will not consume the processing power required to decode the remainder of the packet and therefore, for example, the station may go into a low power mode.

Communication Path 3: The legacy station 530 accidentally receives a packet originating from the access point (AP) 540.

Legacy stations in general are not aware of ER packet headers. Therefore, the legacy station 530 will correctly decode the first part of the ER packet which is contained in the first symbol of the header field and is identical to the standard 802.11a SIGNAL field, except for the ER-enable bit which the legacy station 530 should ignore since it is reserved.

The legacy station 530 sets the NAV, and related counters, based on the "spoofed" RATE/LENGTH information contained in the SIGNAL Field as discussed below allowing correct legacy operation of the 802.11a medium occupancy algorithms. Using the spoofed RATE and LENGTH information, the legacy station 530 will incorrectly demodulate the data symbols, since the station does not know the optimized communication parameters, until eventually a CRC error will cause the packet to be ignored.

Communication Path 4: Transmission of packets from an ER-capable station 510 to an access point (AP) 540.

The access point (AP) 540 detects the ER-enable bit, determines the received packet is an ER packet and decodes the RX STA ID bits in the extended header field to determine if the packet is intended for itself. The access point 540 also decodes the TX STA ID in the ER header and determines which station has transmitted the packet. Based on this information, the access point 540 uses the stored optimized communication parameters that are to be used when receiving packets from that particular transmitter station. The access point 540 then uses the optimized parameters to correctly decode the remainder, i.e., DATA Field, of the packet. Of course, the access point 540 had sent the optimized communication parameters to the transmitter station earlier in the communications session.

Communication Path 5: Another ER-capable station 520 accidentally receives a packet originating from ER station 510.

The station 510 detects the ER-enable bit, with the cooperation of the ER detection module, determines this is an ER packet and decodes, with the cooperation of the STA ID de/encoder 650, the RX ST ID bits in the extended header field to determine that the packet is not intended for itself. The station 510 then sets the NAV, and related counters, based on the "spoofed" RATE, LENGTH information contained in the SIGNAL Field as discussed below. Since the station 510 knows that this packet is not intended for itself, the station 510 does not even have to decode the packet. An additional benefit of this method is that when this happens, a station can detect very early that it is not the intended recepient of the the packet and therefore the station does not need to decode the remainder of the packet. This will save, for example, power in the station since the station will not consume the processing power to decode the remainder of the packet and therefore the station may, for example, go into the low power mode.

Communication Path 6: Legacy station 530 accidentally receives a packet originating from an ER-enabled station 510.

This scenario produces the same results as illustrated in relation to communication path 3.

"Spoofing" the RATE and LENGTH Field.

When a legacy station receives an ER packet, such as in communication paths 3 and 6, the legacy station must be able to determine the duration of the packet, i.e., the time required for packet transmission, based on the standard 802.11a header contained in the first symbol of the ER packet header, which every station can correctly decode. Thus, for the legacy station, R1-R4 bits, which do not have any meaning to the ER-capable RX STA, must be set to one of the legitimate patterns used in the 802.11a standard, shown in Table 1. Additionally, the LENGTH field must be filled in in conjunction with the RATE field in a way that the required time for packet transmission that the legacy RX STA would calculate based on the "spoofed" RATE and LENGTH parameters would coincide with the one that is needed by the ER RX STA using optimized communication parameters. This will guarantee that the legacy station will correctly set its network allocation vector (NAV) and other related counters so the accurate operation of the contention algorithm for the medium access will be maintained.

A ER-capable RX STA will also exploit the spoofed RATE, LENGTH information shown in the SIGNAL field when the packet is not intended for its reception, such as in cases 2 and 5. Once the ER-capable RX STA recognizes that the reserved bit R is turned on, the ER-capable RX STA examines the extended SIGNAL symbol and, based on the RX STA ID, determines that this packet is not intended for itself. Based on the 'spoofed' RATE and LENGTH information in the SIGNAL Field, the RX STA sets the counters related with virtual carrier sense algorithm in exactly the same manner as the legacy station and may then enter the power saving mode.

As an example, the ER data rate is 108 Mbps, which is twice the maximum data rate (54 Mbps) of conventional 802.11a systems. This may be achieved by, for example, bit loading and using trellis coded modulation. A system transmitting at 108 Mbps will have 432 data bits per symbol. Therefore, transmitting a packet with, for example, 864 bytes will require 864*8/432=16 symbols. In addition, the ER protocol requires an extra symbol in the ER header, as compared to standard 802.11a systems, that contains the TX and RX Station IDs. Therefore, the transmission of an 864 byte packet requires 16+1=17 symbols at 108 Mbps. In order to allow legacy 802.11a stations to correctly determine the NAV, the RATE and LENGTH Fields of the ER header need to be set so that the legacy station will also determine that 17 symbols are needed for transmission of the packet. Therefore, for example, the RATE and LENGTH fields could be set to RATE=54 Mbps and LENGTH=459 bytes. In this case, since 54 Mbps results in 216 data bits per symbol, the legacy station would determine the packet duration to be 459*8/216=17 symbols and correctly set the NAV. Obviously other RATE and LENGTH combinations can be used from the 802.11a standard to enable the legacy station to correctly set the NAV. For example, RATE=6 Mbps and LENGTH=51 bytes would also result in a packet whose data field is 17 symbols long.

In the example described above, the extended header field only contained the RX and TX STA IDs. This implies that there is only one set of optimized parameters for each TX/RX communication. In an alternative embodiment, the extended header field also, or alternatively, contains an indication of which one of a plurality of optimized communication parameters sets is to be used for transmission and reception of a packet. These parameter sets are sent from the receiver station to the transmitter station and stored in each.

The above-described communication system can be implemented on wired or wireless telecommunications devices, such a modem, a multicarrier modem, a DSL modem, an ADSL modem, an XDSL modem, a VDSL modem, a multicarrier transceiver, wired or wireless wide/local area network system, or the like, or on a separate programmed general purpose computer having a communications device. Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, modem, transmitter/receiver, or the like. In general, any device capable of implementing a state machine that is in turn capable of implementing the flowcharts illustrated herein can be used to implement the various communication methods according to this invention.

Furthermore, the disclosed methods may be readily implemented in software using object or object-oriented software development environments that provide portable source code that can be used on a variety of computer or workstation platforms. Alternatively, the disclosed communication system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein however can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated communication system, or the like. The communication system can also be implemented by physically incorporating the system and method into a software and/or hardware system, such as the hardware and software systems of a communications transceiver.

It is therefore apparent that there has been provided, in accordance with the present invention, systems and methods for exchanging communication parameters. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method for multicarrier communication in a packet-based local area network comprising:
    transmitting or receiving a first packet using a first cyclic prefix length for a data portion of the first packet; and
    transmitting or receiving a second packet using a second cyclic prefix length for a data portion of the second packet, wherein the first cyclic prefix length is different than the second cyclic prefix length.

2. The method of claim 1, wherein a Signal field indicates the length of the cyclic prefix.

3. A method for multicarrier communication in a packet-based local area network comprising:
    transmitting or receiving a first packet using a first pilot tone allocation for a data portion of the first packet;
    transmitting or receiving a second packet using a second pilot tone allocation for a data portion of the second packet, wherein the first pilot tone allocation is different than the second pilot tone allocation.

4. The method of claim 3, wherein a Signal field indicates the pilot tone allocation.

5. A multicarrier transceiver in a packet-based local area network capable of transmitting or receiving a first packet using a first cyclic prefix length for a data portion of the first packet and capable of transmitting or receiving a second packet using a second cyclic prefix length for a data portion of the second packet, wherein the first cyclic prefix length is different than the second cyclic prefix length.

6. The transceiver of claim 5, wherein a Signal field indicates the length of the cyclic prefix.

7. A multicarrier transceiver in a packet-based local area network capable of transmitting or receiving a first packet using a first pilot tone allocation for a data portion of the first packet and capable of transmitting or receiving a second packet using a second pilot tone allocation for a data portion of the second packet, wherein the first pilot tone allocation is different than the second pilot tone allocation.

8. The transceiver of claim 7, wherein a Signal field indicates the pilot tone allocation.

* * * * *